United States Patent

[11] 3,596,079

[72] Inventors  Martin C. Clark
 2321 Deake Place;
 Verl T. Dady, 1205 S. Mitchell, both of Casper, Wyo. 82601
[21] Appl. No. 801,044
[22] Filed Feb. 20, 1969
[45] Patented July 27, 1971

[54] POWER CONTROL AND BACKUP LIGHT FOR VEHICLE REARVIEW MIRROR
6 Claims, 5 Drawing Figs.

[52] U.S. Cl. .................................................. 240/7.1,
 74/96, 248/486, 350/289
[51] Int. Cl. .................................................. B60q 1/02
[50] Field of Search ........................................... 240/7.1,
 4.2, 57, 61; 350/289, 6; 248/479, 485, 486; 74/42, 96

[56] References Cited
UNITED STATES PATENTS
1,308,182  7/1919  Leuckert ............................ 240/8.2
2,594,784  4/1952  Mead .................................. 240/7.1
3,075,431  1/1963  White .................................. 350/289
3,132,201  5/1964  Bertell et al. ..................... 350/289
3,416,854  12/1968 Fykes ................................. 350/289
3,429,639  2/1969  Peters ................................ 350/289
3,492,065  1/1970  Kurz .................................. 350/289

Primary Examiner—Samuel S. Matthews
Assistant Examiner—Fred L. Braun
Attorneys—Clarence A. O'Brien and Harvey B. Jacobson ABSTRACT: An assembly including upper and lower mounting portions secured to vertically spaced side portions of a vehicle above and below a window opening and further including a generally U-shaped frame consisting of generally parallel upper and lower horizontal legs interconnected at one pair of corresponding ends by means of an upstanding bight portion. The other pair of ends of the legs are oscillatably supported from the mounting portions for oscillation about aligned axes and a light and mirror are supported from the frame and a reversible motor is connected between one of the mounting portions and the frame for oscillating the latter.

PATENTED JUL 27 1971

Martin C. Clark
Verl T. Dady
INVENTORS

BY *O'Brien*
and *Harvey B. Jacobson*
Attorneys

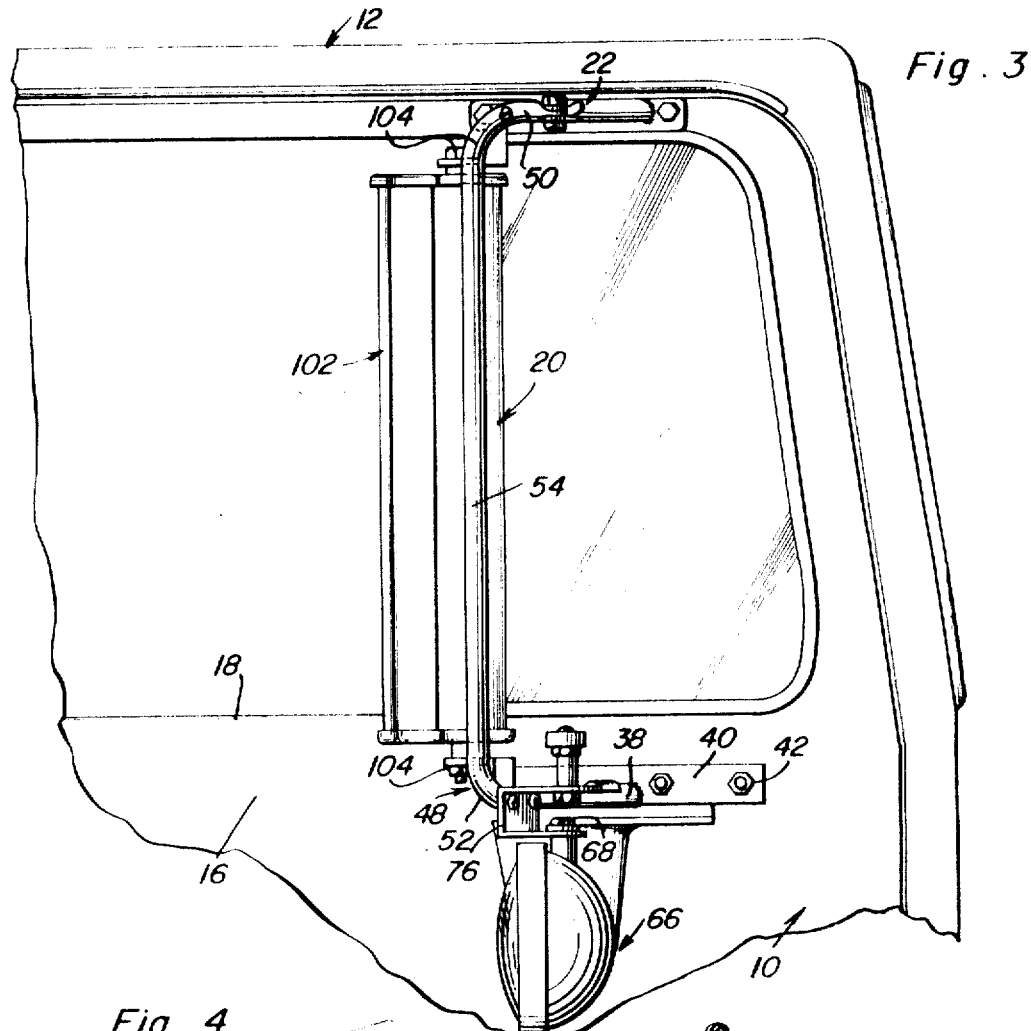
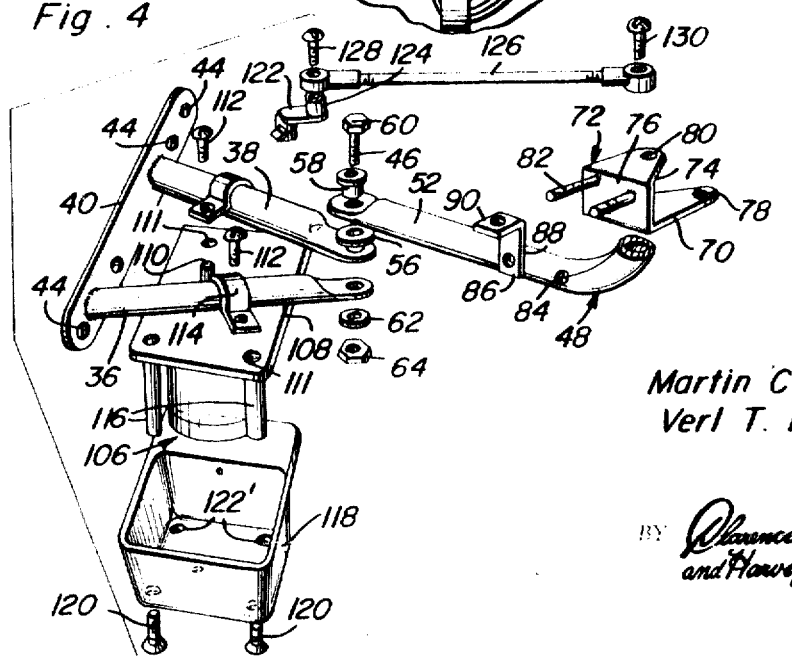

POWER CONTROL AND BACKUP LIGHT FOR VEHICLE REARVIEW MIRROR

The mirror assembly of the instant invention is designed primarily for use on the right-hand side of tractor vehicles of the type having semitrailers or full trailers coupled thereto. Although the mirror assembly is adapted specifically for use on the right-hand side of the tractor, it may also be utilized on the left-hand side of a tractor in addition to the mirror provided on the right-hand side.

When backing a tractor and semitrailer rig the driver of the tractor may readily view the area alongside and to the rear of the left side of the vehicle. However, the driver's view to the rear and alongside the right-hand side of the vehicle, through a conventional outside rear vision mirror is greatly limited inasmuch as a conventional mirror affords only a restricted field of view along a path generally paralleling the right-hand side of the tractor portion of the vehicle. While the driver of the vehicle may move his head from one side to the other while viewing through his left-hand outside rear vision mirror in order to obtain a greater field of view along the left-hand side of the vehicle, because of the greater distance between the driver's head and the outside right-hand rear vision mirror the same movement of the driver's head from one side to the other or either forward or backward does not provide the same increased field of view.

Accordingly, it is the main object of this invention to provide a mirror specifically adapted for mounting exteriorly of the right-hand side of a vehicle and to provide an increased field of view rearwardly along the vehicle. The mirror of the instant invention is supported for oscillation about a vertical axis and a motor is connected between the mirror and a stationary portion of the vehicle for oscillating the mirror whereby the driver of the vehicle may be afforded an increased field of vision along the right-hand side of his vehicle.

Another object of this invention, in accordance with the immediately preceding object, is to provide a rear vision mirror assembly including illumination means for directing a beam of light along the path of view afforded the driver of the vehicle through the rear vision mirror in order that the increased field of vision afforded the driver of the vehicle by means of the oscillatable mirror will not be excessively reduced during the hours of darkness.

A final object of this invention to be specifically enumerated herein is to provide a rear vision mirror assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a fragmentary side elevational view of the assemblage illustrated in FIG. 1;

FIG. 4 is an exploded perspective view of the lower portions of the mirror assembly with the upper support frame for the mirror element being broken away.

Figure 1:
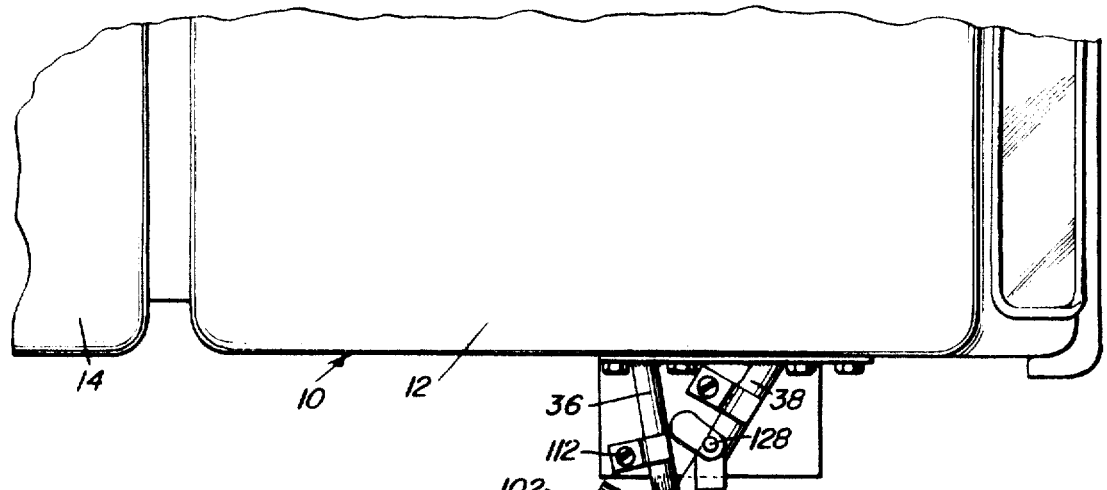
FIG. 1 is a fragmentary top plan view of a conventional form of tractor-semitrailer vehicle with the mirror assembly of the instant invention shown mounted on the right-hand side of the tractor portion and an upper portion of the support frame for the mirror being broken away and illustrated in horizontal section.
Figure 2:
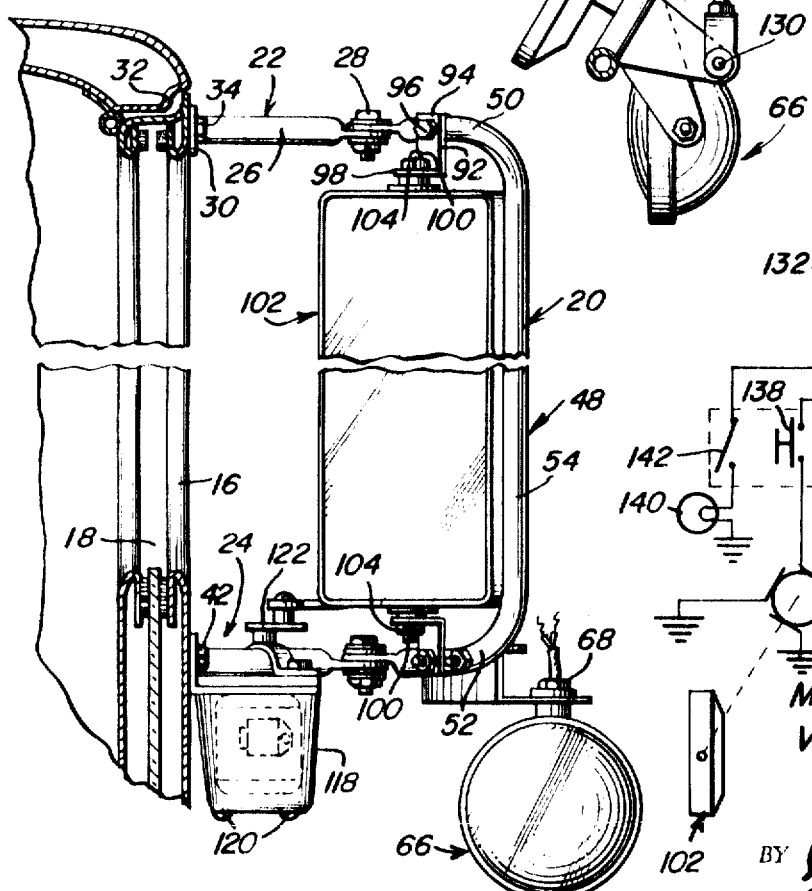
FIG. 2 is a fragmentary transverse vertical sectional view taken through the assemblage illustrated in FIG. 1 and with all components of the mirror assembly of the instant invention illustrated in elevation.

Referring now more specifically to the drawings, the numeral 10 generally designates a conventional form of vehicle including a tractor portion 12 and a semitrailer portion 14, each of the portions 12 and 14 being of conventional design. The tractor portion 12 includes a left-hand door 16 having a window opening 18 formed therein.

The mirror assembly of the instant invention is referred to in general by the reference numeral 20 and includes an upper mounting assembly referred to in general by the reference numeral 22 and a lower mounting assembly generally referred to by the reference numeral 24. The upper assembly 22 includes a pair of outwardly convergent support arms 26 whose outer ends are secured together in vertically overlapped relation by means of a pivot fastener 28. The inner ends of the support arms 26 are secured to a mounting plate 30 at points spaced longitudinally therealong and the opposite ends of the mounting plate 30 are secured to the upper marginal edge portion 32 by means of fasteners 34. The lower mounting assembly 24 is similar to the mounting assembly 22 in that the lower assembly 24 includes a pair of outwardly convergent support arms 36 and 38 similar to the support arms 26 and whose inner ends are secured to an elongated mounting plate 40, the mounting plate 40 being secured to the door 16 below the opening 18 by means of suitable fasteners 42 secured through the apertures 44 formed in the mounting plate 40 and in the door 16. Also, the outer ends of the support arms 36 and 38 are secured together by means of a pivot fastener 46 secured therethrough.

A generally U-shaped support frame referred to in general by the reference numeral 48 is provided and includes a pair of upper and lower generally horizontal and parallel legs 50 and 52 interconnected at their outer ends by means of an integral bight portion 54. The inner ends of the legs 50 and 52 are flattened and are swingably supported from the pivot fasteners 28 and 46, the inner end of the leg 50 being lapped over the rear support arm 26 and the forward support arm 38. Further, a flat washer 56 is disposed about the pivot fastener 46 between the outer end of the support arm 38 and the inner end of the leg 52 and a bushing 58 is disposed about the pivot fastener 46 and extends between the head 60 of the fastener 46, through the inner end of the leg 52 and abuts the flat washer 56. Of course, a second flat washer 62 is disposed about the pivot fastener 46 below the outer end of the support arm 36 and a threaded nut 64 is threadedly engaged on the lower end of the pivot fastener 46. Also, it is to be noted that the pivot fastener 28 is provided with related components such as the washers 56 and 62 and the bushing or sleeve 58 whereby the frame 48 is freely oscillatable relative to the mounting assemblies 22 and 24.

A light assembly referred to in general by the reference numeral 66 is provided and includes a mounting bolt 68 by which the light assembly 66 is secured to the lower flange 70 of a U-shaped mounting bracket referred to in general by the reference numeral 72. The mounting bracket 72 includes an upper flange 74 and an upstanding bight portion 76 formed integrally with and extending between corresponding edge portions of the flanges 70 and 74. The mounting bolt 68 is secured through an aperture 78 formed in the lower flange 70 and the upper flange 74 is provided with a similar aperture 80.

The mounting bracket 72 is secured to the outer end of the lower leg 52 of the frame 48 by means of a pair of threaded studs 82 projecting outwardly from the bight portion 76 and secured through apertures 84 provided therefor in the outer end of the leg 52. The vertical flange portion 86 of an inverted L-shaped bracket 88 including an upper horizontal flange 90 is also secured to the outer end of the leg 52 by means of one of the threaded studs 82 secured through the leg 52. An upper L-shaped mounting bracket 92 is provided and includes an upstanding flange 94 secured to the leg 50 by means of a fastener 96 and a horizontal flange 98 projecting outwardly from the lower end of the upstanding flange 94. The flanges 90 and 98 are apertured and have upper and lower shank portions 100 of a mirror element referred to in general by the reference numeral 102 secured therethrough. The shank portions 100 are aligned and are secured through the flange portions 90 and 98 by means of threaded fasteners 104 which tend to frictionally retain the mirror element 102 in adjusted oscillated positions relative to the frame 48.

A gear head motor referred to in general by the reference numeral 106 includes a mounting plate 108 through which an output shaft 110 is journaled and the mounting plate is provided with a plurality of threaded apertures 111 in which threaded fasteners 112 passed through clamp members 114 engaged with the support arms 36 and 38 are secured whereby the mounting plate 108 is secured to the support arms 36 and 38. The mounting plate 108 includes depending internally threaded support sleeves 116 and an upwardly opening cup-shaped cover 118 is secured about the gear head motor 106 and to the underside of the mounting plate 108 by means of fasteners 120 secured through openings 122' formed in the bottom of the cover 118 and threadedly engaged in the lower ends of the threaded sleeves 116.

A crank arm 122 is secured over the upper end of the output shaft 110 and to the latter for rotation therewith and the outer end of the crank arm 122 includes a crankpin 124 journaled through one end of an adjustable length rod 126. The rod 126 is secured on the crankpin 124 by means of a fastener 128 and the other end of the adjustable length rod 126 is secured to the upper flange 74 by means of a fastener 130 secured through the rod end and the aperture 80 formed in the flange 74.

Figure 5:
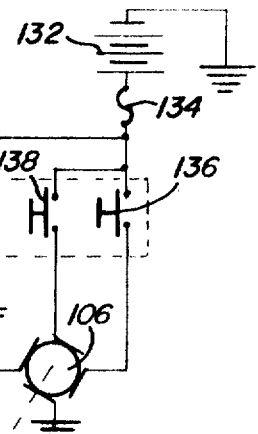
FIG. 5 is a diagrammatic view illustrating the wiring circuit of the mirror assembly.

With attention now invited more specifically to FIG. 5 of the drawings, it may be seen that the tractor 12 includes a battery 132 and that the gear head motor 106 is of the reversible type and electrically connected to the battery 132 through a fuse 134 by means of a pair of switches 136 and 138 which may be actuated to drive the motor 106 in opposite directions. In addition, the light assembly 66 includes a bulb 140 electrically connected to the battery 132 through the fuse 134 and a third switch 142.

It will be noted that the light assembly 66 may have its mounting bolt 68 loosened so as to adjustably rotate the light assembly 66 relative to the lower flange 70 of the mounting bracket 72 before again tightening the mounting bolt 68. Also, the mirror element 102 may be adjustably oscillated relative to the horizontal flange portions 90 and 98 of the corresponding mounting brackets. Of course, the switches 136, 138 and 142 are located within the tractor 12 at a location readily accessible to the driver of the tractor 12 and thus, during the hours of darkness, the light assembly 66 may be actuated at any time by actuating the switch 142. Further, should it be necessary to slightly oscillate the mirror element 102, the desired switch 136 may be actuated whereby the motor 106 will in turn be actuated so as to oscillate the frame 48, and thus the mirror element 102, relative to the door 16 of the tractor 12.

The gear head motor output shaft 110 rotates at approximately 10 r.p.m. and while the gear head motor 106 is illustrated in FIG. 5 as being electrically connected to a conventional vehicle battery 132, the gear head motor 106 could be operated from a 110-volt power source and the supply of current at 110 volts could be provided from the battery 132 if suitable voltage-controlling apparatus (not shown) are interposed between such a 110-volt motor and the battery 132. Also, it is to be noted that the effective moment arm by which the crank 122 is connected to the rod 126 is considerably shorter than the moment arm extending between the fastener 130 and the pivot fastener 46. Thus, a full revolution of the output shaft 110 of the gear head motor 106 is operable to oscillate the frame 48 through an arc of only approximately 70°. Thus, should either the switch 136 or 138 be inadvertently left in the "on" position, the continuous operation of the gear head motor 106 would merely result in the frame 48 being continuously oscillated back and forth through an arc of only 70°.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What we claim as new is as follows:

1. In combination, upper and lower mounting portions for securement to vertically spaced side portions of a vehicle, an upright member extending between and pivotally secured at its upper and lower ends to said upper and lower mounting portions for oscillation about aligned axes, a rear vision mirror supported from said member for oscillation therewith and friction-resisted oscillation relative thereto about a second parallel axis, and a reversible motor operatively connected between said member and one of said mounting portions for oscillating said member, said reversible motor including an electric speed reducer motor including an output shaft having an eccentric crankpin mounted thereon, an elongated rod having one end journaled on said crankpin and a pin carried by said upright member eccentrically disposed relative to and generally paralleling said axes upon which the other end of said rod is journaled the length of the moment arm established between the crankpin and output shaft axis being less than the length of the moment arm established between the pin carried by said upright member and the axes of oscillation of said upright member, whereby continuous operation of said motor, in either direction, will merely result in continuous oscillation of said upright member through an arc of less than 180°, said rod being adjustable in effective length.

2. The combination of claim 1 wherein said upright member comprises a generally U-shaped frame including upper and lower generally horizontal parallel legs interconnected at one pair of corresponding ends by means of an upstanding bight portion, said aligned axes extending between the other pair of ends of said legs.

3. The combination of claim 2 wherein said mirror element is supported from said frame for adjustable angular positioning relative to said frame about an axis generally paralleling said axes.

4. The combination of claim 1 including a light assembly supported from said upright member for oscillation therewith.

5. The combination of claim 1 wherein said upper and lower mounting portions each include a pair of horizontal support arms convergent toward one pair of corresponding ends and secured at the other pair of ends to an elongated mounting plate at points spaced therealong, the convergent ends of each pair of arms being secured together and each end of said upright member being secured to the convergent ends of the corresponding pair of support arms.

6. The combination of claim 1 wherein said speed reducer motor is supported from one of said upper and lower mounting portions.